US011343719B2

(12) United States Patent
Sun et al.

(10) Patent No.: US 11,343,719 B2
(45) Date of Patent: May 24, 2022

(54) METHOD FOR RESERVING AND ALLOCATING RESOURCES FOR ULTRA-LOW-LATENCY UPLINK SERVICE FLOW BASED ON AIR INTERFACE SLICE (71) Applicant: University of Electronic Science and Technology of China, Chengdu (CN)

(72) Inventors: Guolin Sun, Chengdu (CN); Kun Xiong, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 120 days.

(21) Appl. No.: 16/756,128

(22) PCT Filed: Oct. 18, 2018

(86) PCT No.: PCT/CN2018/110906
§ 371 (c)(1),
(2) Date: Apr. 15, 2020

(87) PCT Pub. No.: WO2020/062359
PCT Pub. Date: Apr. 2, 2020

(65) Prior Publication Data
US 2021/0092648 A1    Mar. 25, 2021

(30) Foreign Application Priority Data
Sep. 26, 2018  (CN) .......................... 201811121680.7

(51) Int. Cl.
H04W 28/26    (2009.01)
H04L 5/00     (2006.01)
(Continued)

(52) U.S. Cl.
CPC ........... *H04W 28/26* (2013.01); *H04L 5/0035* (2013.01); *H04W 72/0413* (2013.01); *H04W 72/1268* (2013.01)

(58) Field of Classification Search
None
See application file for complete search history.

(56) References Cited

U.S. PATENT DOCUMENTS

2009/0265450 A1* 10/2009 Helmer ............... H04L 41/0893
709/221
2010/0091725 A1*  4/2010 Ishii .................... H04W 72/04
370/329
(Continued)

FOREIGN PATENT DOCUMENTS

CN    107786597 A    3/2018
CN    108092924 A    5/2018
(Continued)

Primary Examiner — Steve R Young
(74) Attorney, Agent, or Firm — Bayramoglu Law Offices LLC (57) ABSTRACT A method for reserving and allocating resources for an ultra-low-latency uplink service flow based on an air interface slice includes: virtualizing an air interface resource of a base station side into an ultra-low-latency slice resource and a non-ultra-low-latency slice resource; recording a collision situation on reserved resources in each retry window, and dynamically adjusting a size of the reserved ultra-low-latency slice resource; after detecting that a terminal transmits ultra-low-latency data on the ultra-low-latency slice resource, performing a resource reallocation and determining whether an idle resource is presented; if presented, allocating the idle resource to the terminal transmitting the ultra-low-latency data and returning the borrowed non-ultra-low-latency slice resource after transmitting the ultra-low-latency data; and if not presented, borrowing the non-ultra-low-latency slice resource allocated to a non-ultra-low- (Continued)

latency terminal and returning the borrowed non-ultra-low-latency slice resource after transmitting the ultra-low-latency data.

9 Claims, 11 Drawing Sheets

(51) Int. Cl.
*H04W 72/04* (2009.01)
*H04W 72/12* (2009.01)

(56) References Cited

U.S. PATENT DOCUMENTS

| | | | |
|---|---|---|---|
| 2017/0164349 A1* | 6/2017 | Zhu | H04W 76/10 |
| 2018/0049227 A1* | 2/2018 | Moon | H04W 72/0446 |
| 2018/0249456 A1* | 8/2018 | Liu | H04W 72/0486 |
| 2018/0352491 A1* | 12/2018 | Shih | H04W 8/02 |
| 2019/0208555 A1* | 7/2019 | Zee | H04W 92/045 |
| 2019/0289534 A1* | 9/2019 | Ryoo | H04W 80/02 |
| 2019/0357224 A1* | 11/2019 | Li | H04W 72/042 |
| 2020/0037214 A1* | 1/2020 | Jin | H04W 76/27 |
| 2021/0211942 A1* | 7/2021 | Guo | H04L 43/08 |

FOREIGN PATENT DOCUMENTS

| | | |
|---|---|---|
| CN | 108347736 A | 7/2018 |
| WO | 2018082443 A1 | 5/2018 |

* cited by examiner

METHOD FOR RESERVING AND ALLOCATING RESOURCES FOR ULTRA-LOW-LATENCY UPLINK SERVICE FLOW BASED ON AIR INTERFACE SLICE

CROSS REFERENCE TO THE RELATED APPLICATIONS

This application is the national phase entry of International Application No. PCT/CN2018/110906, filed on Oct. 18, 2018, which is based upon and claims priority to Chinese Patent Application No. 201811121680.7, filed on Sep. 26, 2018, the entire contents of which are incorporated herein by reference.

TECHNICAL FIELD

The present invention belongs to the technical field of air interface communication, and more specifically relates to a method for reserving and allocating resources for an ultra-low-latency uplink service flow based on an air interface slice.

BACKGROUND

An air interface communication refers to a communication between a mobile terminal and a base station. An air interface is a wireless communication protocol between the base station and the mobile terminal, which defines the frequency, bandwidth, access timing, coding method, and hand-off of each wireless channel. The latency of the air interface communication is mainly affected by factors including a data transmission duration, a data transmission resource request waiting time, a feedback delay caused by data processing and the like.

However, the existing air interface communication has the following disadvantages:

1. In the prior art, the wireless terminal switches from the idle mode to a connected mode by means of actively applying for resource allocation. The resource is allocated by the base station according to the reported buffer status report (BSR), which cannot meet the latency requirement of several milliseconds.

2. The existing transmission frame structure is composed of 10 subframes to form a 10 ms frame, which cannot meet the latency requirement of ultra-low latency of less than 10 ms.

3. The existing dynamic scheduling methods all have a certain scheduling delay. The resources in each frame must be scheduled in advance for each terminal to transmit data. The ultra-low-latency service cannot tolerate this scheduling delay.

SUMMARY

An objective of the present invention is to provide a method for reserving and allocating resources for an ultra-low-latency uplink service flow based on an air interface slice, so as to solve the above-mentioned problems in the prior art.

To achieve the above objective, the technical solution used by the present invention is as follows:

A method for reserving and allocating resources for an ultra-low-latency uplink service flow based on an air interface slice includes:

virtualizing an air interface resource of a base station side into an ultra-low-latency slice resource and a non-ultra-low-latency slice resource;

recording a collision situation on reserved resources in each retry window, and dynamically adjusting a size of the reserved ultra-low-latency slice resource according to the collision situation;

reallocating the ultra-low-latency service resource in response to the detection of a terminal on the ultra-low-latency slice resource to transmit ultra-low-latency data, and determining whether an idle resource is presented in the non-ultra-low-latency slice resource;

if the idle resource is presented, then allocating the idle resource to the terminal transmitting the ultra-low-latency data and returning the borrowed non-ultra-low-latency slice resource after transmitting the ultra-low-latency data; and if the idle resource is not presented, then borrowing the non-ultra-low-latency slice resource that has been allocated to a non-ultra-low-latency terminal and returning the borrowed non-ultra-low-latency slice resource after transmitting the ultra-low-latency data.

Preferably, a method for negotiating ultra-low latency reserved resources includes:

initiating an ultra-low-latency service registration request by an ultra-low-latency terminal or an application server, and requesting the base station to reserve resources for an ultra-low-latency service slice; and parsing, by the base station, the resource reservation request, and judging and approving the resource reservation request by the base station, and indicating a location and time slot of the reserved resource through a bitmap.

Preferably, a method for transmitting the ultra-low-latency data includes:

receiving an ultra-low-latency reserved slice resource indication by bitmap from the base station, following by parsing the position and time slot of the reserved resource in the bitmap;

counting, by the base station, the number of terminals having collisions in a retry window, followed by predicting the number of terminals participating in a competition in a next retry window, thereby realizing a dynamic adjustment of reserved resources; and retransmitting, in the first subframe of the next retry window, the ultra-low-latency reserved slice resource indication by bitmap to notify each terminal of the adjustment result of the reserved resources.

Preferably, a method for scheduling and borrowing ultra-low-latency service resources includes:

when the base station detects ultra-low-latency data is transmitted on the ultra-low-latency slice resource, first determining whether a utilization rate of the non-ultra-low-latency slice resource is less than a preset threshold;

if the current utilization rate of the non-ultra-low-latency slice resource is less than or equal to the preset threshold, allocating the idle non-ultra-low-latency slice resource to a terminal needing to transmit the ultra-low-latency data and allocating the idle non-ultra-low-latency slice resource to the ultra-low-latency service on the terminal through a physical downlink control channel (PDCCH) control signaling by the base station; and if the current utilization rate of the non-ultra-low-latency slice resource is greater than the preset threshold, borrowing the non-ultra-low-latency slice resource that has been allocated for the non-ultra-low-latency service terminal, namely, the signaling that is originally configured to notify the non-ultra-low-latency service terminal through the PDCCH control signaling is transmitted to the ultra-low-latency service terminal, the ultra-low-latency terminal borrows the non-ultra-low-latency slice resource to transmit the ultra-low-latency data, and meanwhile, the non-ultra-low-latency terminal borrows a shared buffer of the ultra-low-latency user and transmits the shared buffer to the ultra-low-latency terminal through a device-to-device (D2D) mode, so as to buffer the data configured to be transmitted.

Preferably, a method for returning the ultra-low-latency slice resource includes:

when a buffer status report (BSR) reported by the ultra-low-latency terminal is empty, completing the ultra-low-latency data transmission, returning the borrowed non-ultra-low-latency slice resource to the previous non-ultra-low-latency terminal by the base station.

Preferably, the terminal of the non-ultra-low-latency slice resource returns the shared buffer resource of the ultra-low-latency slice to the ultra-low-latency user through the D2D transmission mode.

Preferably, the transmission frame structure is divided into 100 transmission time intervals (TTIs), and each transmission frame is divided into a plurality of retry windows.

Preferably, the terminal to transmit an ultra-low-latency service actively applies for reserved resource for the ultra-low-latency service, or parses the location and time slot of resource reserved by the base station for ultra-low-latency service from the resource indication frames periodically broadcasted by the base station.

Preferably, the base station in the first subframe of each retry window notifies each terminal of the location and time slot of the reserved resource corresponding to the ultra-low-latency service flow by broadcasting the bitmap.

Preferably, the collisions on the reserved resources in the retry windows include a collision of separate random access channel (RACH) resources and a collision of physical downlink shared channel (PDSCH) resources.

The method for reserving and allocating the resources for the ultra-low-latency uplink service flow based on the air interface slice provided by the present invention has the following advantages.

The present invention uses a dynamic resource reservation method for resource allocation and time delay access, which avoids excessive interaction and delay of resource request signaling of conventional terminals, meets the latency requirements of ultra-low-latency data, and reduces the probability of collisions in the use of reserved resources by terminals. In addition, the base station detects whether there is ultra-low-latency data transmission, and if there is data transmission, then resources are immediately allocated. Meanwhile, when the individual resources are immediately allocated for the ultra-low-latency services, the resources of non-ultra-low-latency services can be preempted, that is, the non-ultra-low-latency resources are borrowed for the data transmission, which reduces the transmission delay of ultra-low-latency data.

DETAILED DESCRIPTION OF THE EMBODIMENTS

Specific embodiments of the present invention are described below to help those skilled in the art understand the present invention. However, it should be clear that the present invention is not limited to the scope of the specific embodiments. For those of ordinary skill in the art, as long as changes are within the spirit and scope of the present invention defined and determined by the claims, these changes are considered to be within the scope of the invention. All inventions utilizing the concept of the present invention fall in the protection scope of the present invention.

Figure 1:
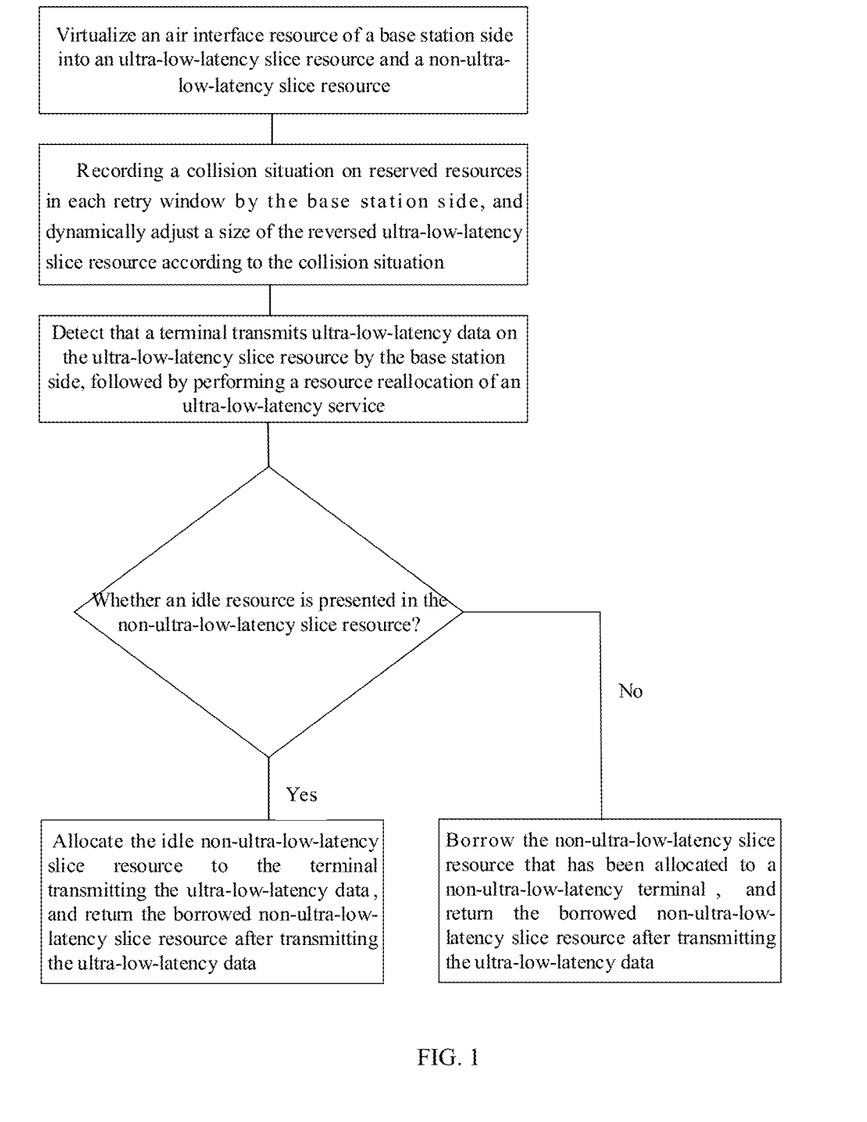
FIG. 1 is a flowchart of a method for reserving and allocating resources for an ultra-low-latency uplink service flow based on an air interface slice.
Figure 2:
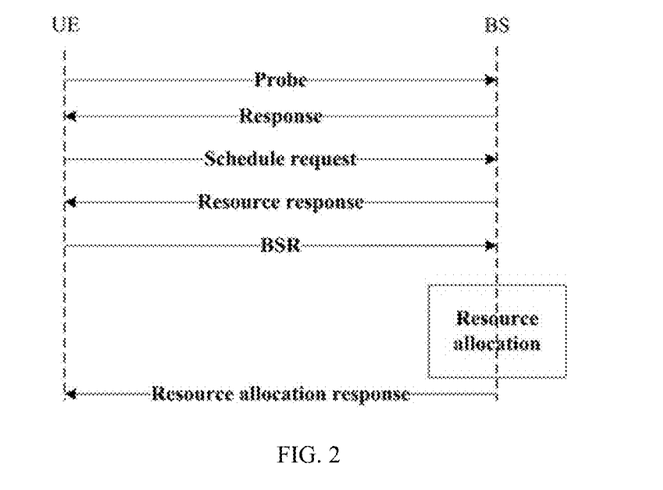
FIG. 2 is an existing signaling flowchart of a resource request.

According to an embodiment of the present invention, referring to FIG. 1, a method for reserving and allocating resources for an ultra-low-latency uplink service flow based on an air interface slice in this solution is implemented as follows.

The air interface resource of a base station side is virtualized into an ultra-low-latency slice resource and a non-ultra-low-latency slice resource.

The collision situation on reserved resources in each retry window is recorded, and the size of the reserved ultra-low-latency slice resource is dynamically adjusted according to the situation.

After detecting that ultra-low-latency data is transmitted by the terminal on the ultra-low-latency slice resource, a resource reallocation of an ultra-low-latency service is performed; and it is determined whether or not there is an idle resource in the non-ultra-low-latency slice resource.

If it is determined that there is an idle resource, then the non-ultra-low-latency slice resource is allocated to the terminal transmitting the ultra-low-latency data, and the borrowed non-ultra-low-latency slice resource is returned after transmitting the ultra-low-latency data.

If it is determined that there is not an idle resource, then the non-ultra-low-latency slice resource that has been allocated to a non-ultra-low-latency terminal is borrowed, and the borrowed non-ultra-low-latency slice resource is returned after transmitting the ultra-low-latency data.

In the present invention, a dynamic resource reservation method is used for resource allocation and delay access. The base station side detects whether an ultra-low-latency data transmission is presented on the reserved resource. If the data transmission is detected, then resources are immediately allocated. Also, preemptive resource scheduling is used, that is, when immediately allocating individual resources for the ultra-low-latency service, the resource of the non-low-latency service can be preempted.

The above steps are described in detail below:

A negotiation of the reserved resource is mainly configured to divide the air interface resource of the base station side into the ultra-low-latency slice resource and the non-ultra-low-latency slice resource. The ultra-low-latency slice resource serves for the ultra-low-latency service, and the non-ultra-low-latency slice resource serves for the non-ultra-low-latency service.

The negotiation of the reserved resource includes a transmission frame structure optimization, an air interface resource virtualization, and an ultra-low-latency service reserved resource negotiation.

Figure 3:
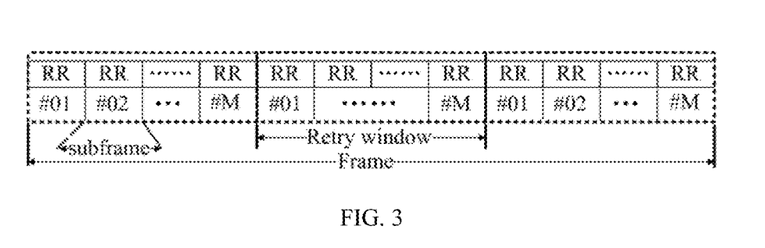
FIG. 3 is a structure diagram of the transmission frame of the method for reserving and allocating resources for the ultra-low-latency uplink service flow based on the air interface slice.

Referring to FIG. 3, in the transmission frame structure optimization, a traditional transmission frame structure is divided into 100 transmission time intervals (TTIs), and each of the TTIs is 0.1 ms. Meanwhile, the transmission frame is divided into a plurality of retry windows. The transmission frame structure is more detailed, which is conducive to the full use of transmission resources and reducing delay.

In the air interface resource virtualization, a bandwidth resource of the base station side is virtualized into the ultra-low-latency slice resource and the non-ultra-low-latency slice resource. Among them, the ultra-low-latency slice resource is a bandwidth resource serving ultra-low-latency data transmission, and the non-ultra-low-latency slice resource is a bandwidth resource serving non-ultra-low-latency (non-ULL) service flows.

Figure 4:
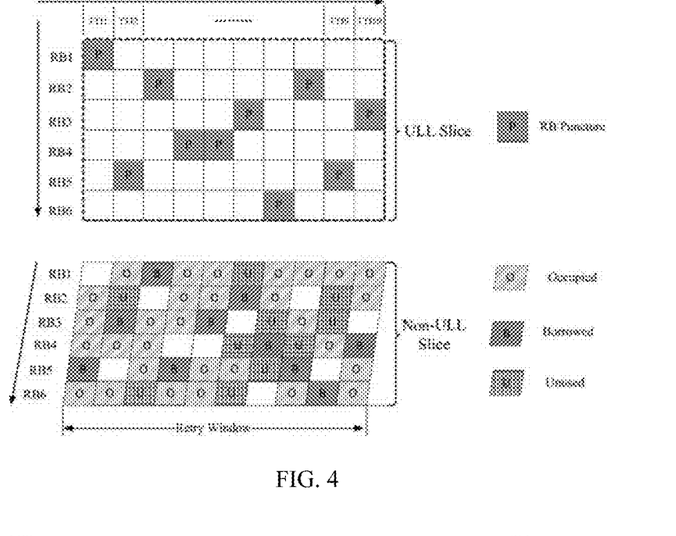
FIG. 4 is a schematic diagram of slice resource classification in resource virtualization in the method for reserving and allocating resources for the ultra-low-latency uplink service flow based on the air interface slice.

Referring to FIG. 4, the ultra-low-latency air interface slice is divided into two parts including a reserved resource and a preempted resource. The ultra-low-latency air interface slice merely contains a resource ULL RB puncture reserved for ultra-low-latency service flows, but the borrowed Non-ULL resource in the non-ULL slice also serves the ultra-low-latency services. In addition, a dynamic mapping between a virtual bandwidth slice resource and an actual physical resource is done by the base station side.

In the ultra-low-latency service reserved resource negotiation, the terminal that needs to transmit ultra-low-latency services can actively request to reserve resources for the ultra-low-latency services, or can parse out a resource location and time slot reserved for the ultra-low-latency services by the base station side from the resource indication frames broadcasted regularly by the base station.

The specific steps are as follows:

An ultra-low-latency terminal or application server initiates an ultra-low-latency service registration request, and requests the base station to reserve resources for its ultra-low-latency service slice.

The base station parses the resource reservation request, judges and approves the resource reservation request, and then indicates the reserved resource location and time slot through a bitmap.

Figure 5:
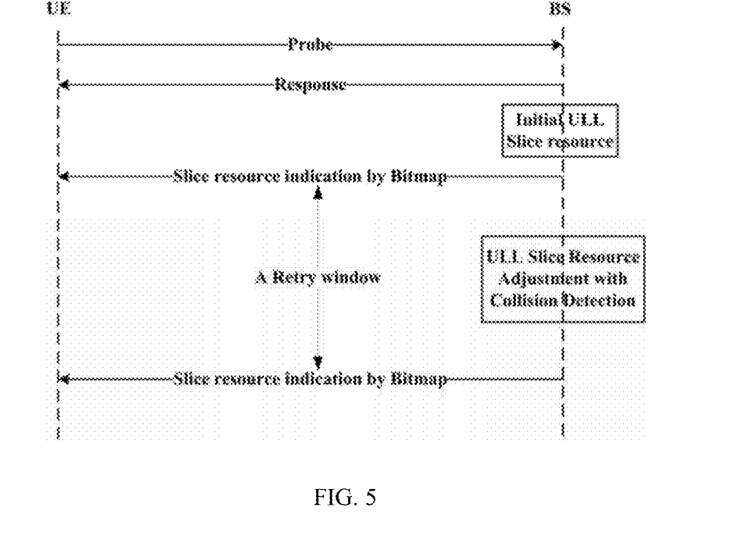
FIG. 5 is a flowchart of a negotiation process of reserved resources and a signaling interaction of dynamically adjusting the reserved resources by base station in the method for reserving and allocating resources for the ultra-low-latency uplink service flow based on the air interface slice.
Figure 6:
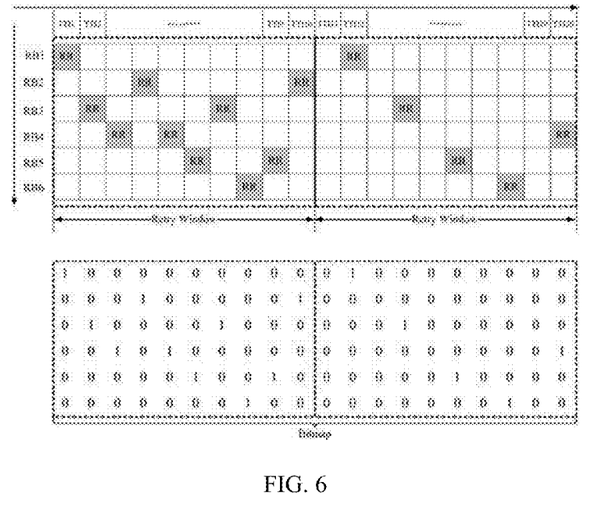
FIG. 6 is a schematic diagram of indicating ultra-low-latency reserved resources through a bitmap in the method for reserving and allocating resources for the ultra-low-latency uplink service flow based on the air interface slice.
Figure 7:
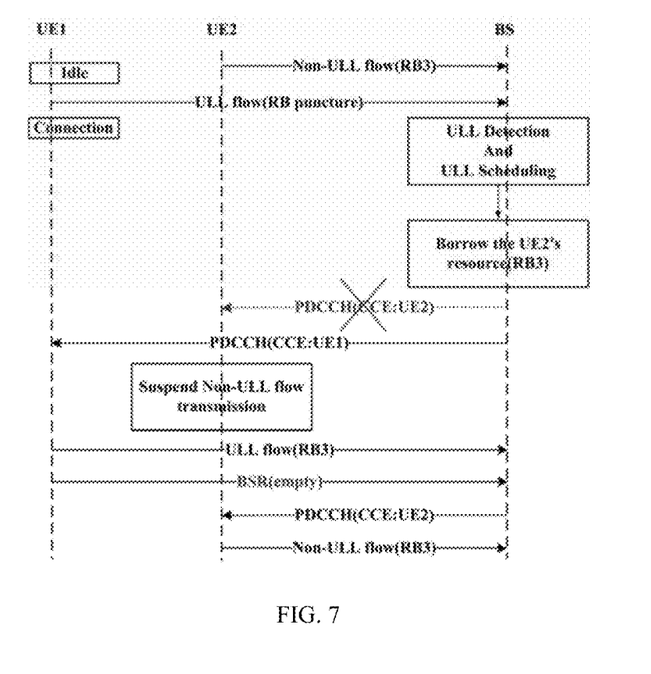
FIG. 7 is a diagram showing a process of using reserved resources and a process of reallocating resources in the method for reserving and allocating resources for the ultra-low-latency uplink service flow based on the air interface slice.

Referring to FIG. 5 and FIG. 6, the dynamic adjustment of the reserved resource includes:

In the first subframe of each of the retry windows, the base station notifies each terminal of the location and time slot of the reserved resource corresponding to the ultra-low-latency service flow by broadcasting the bitmap.

The base station side of each of the retry windows makes a decision of dynamically adjusting the size of the reserved resource according to the detected use condition of the reserved resource. If there are numerous collisions on the reserved resource in the time domain of a certain retry window, then the size of the reserved resource is adjusted in the next reserved resource broadcast frame to meet more data transmission requests.

If there are numerous idle resources on the reserved resource in the time domain of a certain retry window, then the size of the reserved resource is adjusted in the next reserved resource broadcast frame to avoid the waste of resources.

The reserved resource scheduling is a preemptive resource scheduling to preempt the resources of non-low-latency services, that is, to borrow non-ultra-low-latency resources for data transmission, thereby saving the transmission delay of ultra-low-latency data.

Specifically, it includes an ultra-low-latency detection: the base station detects whether there is a data transmission on the reserved ultra-low-latency slice resource in each TTI time slot. If there is a data transmission and the terminal transmitting the ultra-low-latency service can be parsed out, then the terminal is allocated with an independent bandwidth resource to transmit ultra-low-latency data.

In ultra-low-latency slice resource scheduling and borrowing, in response to the base station detecting that there is ultra-low-latency data transmission on a certain ultra-low-latency slice resource, it is determined then whether or not the utilization rate of the non-ultra-low-latency slice resource is lower than a preset threshold.

If the current utilization rate of the non-ultra-low-latency slice resource is less than or equal to the preset threshold, then the idle non-ultra-low-latency slice resource is allocated to a terminal that needs to transmit ultra-low-latency data and the base station side allocates the idle non-ultra-low-latency resource to the ultra-low-latency service on the terminal through physical downlink control channel (PDCCH) control signaling.

If the current utilization rate of the non-ultra-low-latency slice resource is greater than the preset threshold, then the non-ultra-low-latency slice resource that has been allocated for the non-ultra-low-latency service terminal is borrowed, that is, the signaling that is originally configured to notify the non-ultra-low-latency service terminal through the PDCCH control signaling is transmitted to the ultra-low-latency service terminal and the ultra-low-latency terminal borrows the non-ultra-low-latency slice resource to transmit the ultra-low-latency data.

Return of the non-ultra-low-latency slice resource includes: when the ultra-low-latency terminal uses the non-ultra-low-latency slice resource to transmit the ultra-low-latency data and the BSR reported by the ultra-low-latency terminal is empty, it indicates that the ultra-low-latency data transmission is completed. The base station side returns the borrowed non-ultra-low-latency slice resource to the previous non-ultra-low-latency terminal.

According to an embodiment of the present invention, in reserved resource ultra-low-latency data transmission, the idle non-ultra-low-latency slice resource is allocated separately for the ultra-low latency.

Figure 8:
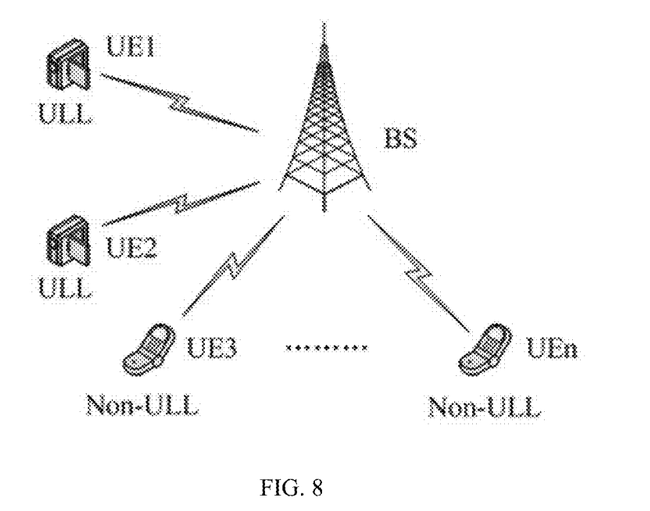
FIG. 8 is a diagram showing an initial scenario of the method for reserving and allocating resources for the ultra-low-latency uplink service flow based on the air interface slice.

Referring to FIG. 8, terminal 1 (UE1) and terminal 2 (UE2) transmit ultra-low-latency data (ULL), and terminal 3 (UE3) and terminal n (UEn) transmit non-ultra-low-latency data (Non-ULL). The specific resource reservation and ultra-low-latency data transmission process include: an ultra-low-latency reserved resource negotiation, an ultra-low-latency data transmission, and an ultra-low-latency service resource reallocation.

Figure 9:
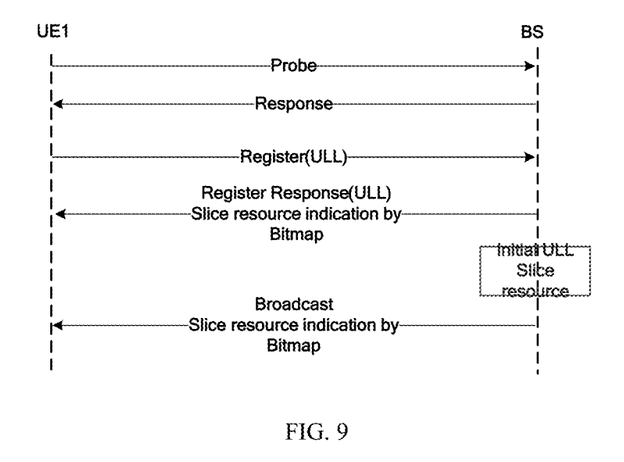
FIG. 9 is a diagram showing a negotiation process of ultra-low-latency reserved resources in the method for reserving and allocating resources for the ultra-low-latency uplink service flow based on the air interface slice.

In the ultra-low-latency reserved resource negotiation, referring to FIG. 9, terminal 1 (UE1) first initiates an ultra-low-latency service registration request Register (ULL), and requests the base station to reserve a resource for an ultra-low-latency service. After parsing the resource reservation request, the base station determines whether to reserve the resource for the corresponding ultra-low-latency service. If the resource is approved to be reserved, then the location and TTI of the reserved RB resource is indicated by bitmap. The specific slice resource indication by bitmap is shown in FIG. 6. A two-dimensional grid composed of the RB resource location and TTI indicates the specific location and time slot of the reserved resource for ultra-low-latency service.

The slice resource indication by bitmap is not necessarily returned when the terminal is registered. The base station side of the first subframe of each of the retry windows (Retry window) broadcasts the slice resource indication by bitmap.

Ultra-Low-Latency Data Transmission

Figure 10:
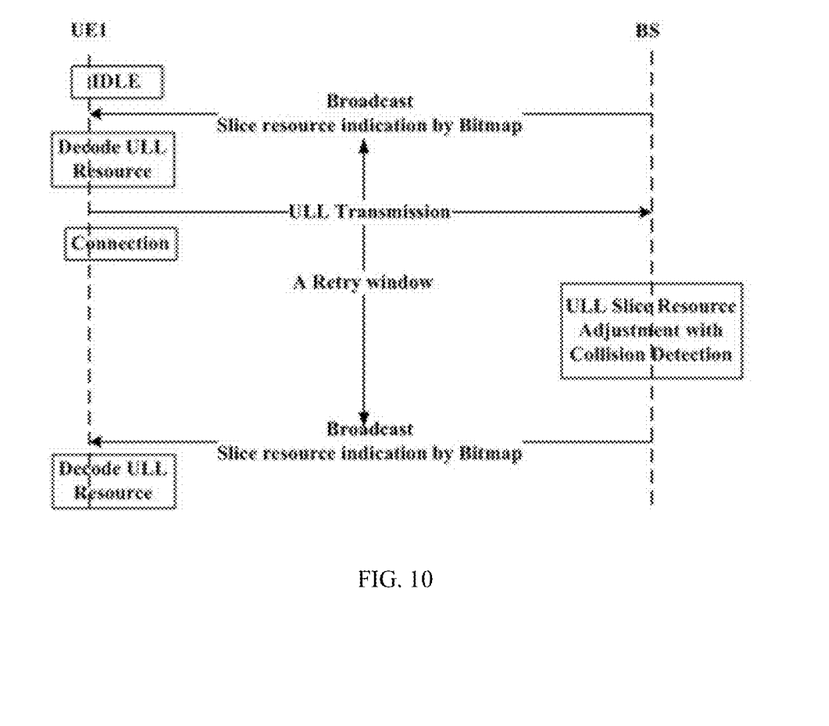
FIG. 10 is a diagram showing a process of using ultra-low-latency reserved resources and a process of dynamically adjusting the reserved resources in the method for reserving and allocating resources for the ultra-low-latency uplink service flow based on the air interface slice.

After receiving the slice resource indication by bitmap on the base station side, the terminal parses out the position and time slot of the reserved resource in the bitmap. Before receiving the next ultra-low-latency reserved resource indication frame on the base station side, the parsed reserved resource can be used to transmit ultra-low-latency data (ULL Transmission) and the base station will count the data transmission conditions on the ultra-low-latency reserved resource within the time interval of one retry window. The size of the reserved resource is dynamically adjusted according to the collision situation on the reserved resource, that is, the ULL Slice Resource Adjustment with Collision Detection shown in FIG. 10. The dynamic adjustment of the reserved resource is realized by predicting the number of participating terminals in the next retry window according to the number of terminals with collisions in one retry window. In the first subframe of the next retry window, the ultra-low-latency reserved resource indication frame Slice Resource Indication by Bitmap is retransmitted to notify each terminal of the adjustment result of the reserved resource.

Ultra-Low-Latency Service Resource Reallocation.

Figure 11:
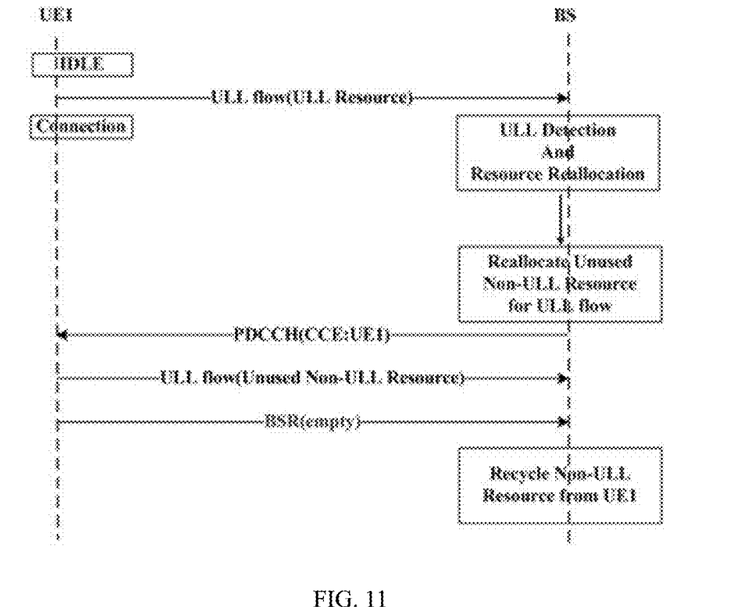
FIG. 11 is a diagram showing a use of ultra-low-latency reserved resources and a process of resource reallocation in the method for reserving and allocating resources for the ultra-low-latency uplink service flow based on the air interface slice.

After the terminal uses the reserved resource to transmit the ultra-low-latency data, when the base station detects that the terminal has transmitted the ultra-low-latency data on the corresponding reserved resource, resources for the ultra-low-latency service on this terminal are reallocated. As shown in FIG. 11, terminal 1 (UE1) uses the reserved resource to perform the ultra-low-latency data transmission ULL flow (ULL Resource), and the base station side detects that terminal 1 (UE1) transmits the ultra-low-latency data on the ultra-low-latency reserved resource (ULL Resource) through ULL Detection. At this time point, the base station reallocates the resource (Resource Reallocation) for the ultra-low-latency service on UE1, and at this time point, the base station first checks whether the non-ultra-low-latency slice resource has idle RB resources. It can be seen from FIG. 10 that the non-ultra-low-latency slice resource has the idle resource (Unused Non-ULL Resource) at this time point, so the base station will allocate the idle non-ultra-low-latency slice resource to the ultra-low-latency service on terminal 1 (UE1) through the control signaling PDCCH (CCE: UE1). After that, UE1 can directly use the non-ultra-low-latency slice resource allocated by the base station to transmit the ultra-low-latency data ULL flow (Unused Non-ULL Resource). When the buffer status of UE1 is empty, i.e., BSR (empty), the base station side recycles the non-ultra-low-latency slice resource allocated to UE1.

Figure 12:
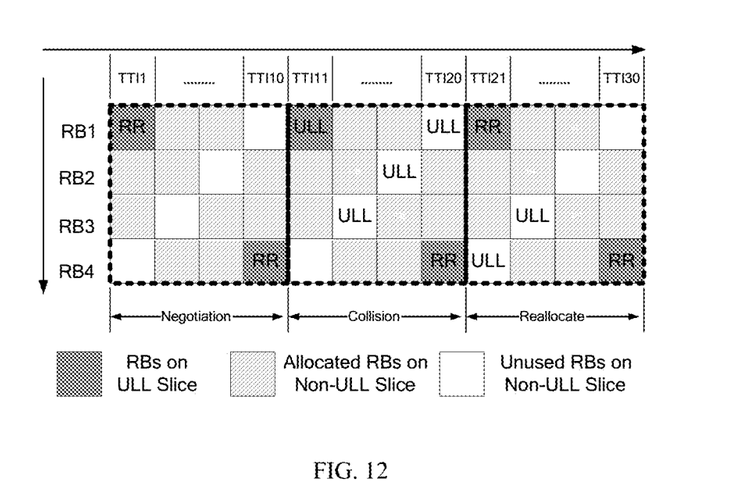
FIG. 12 is a flowchart showing an overall system from the resource negotiation to the resource reallocation (using idle non-ultra-low-latency slice resources to realize the resource reallocation for ultra-low-latency services) in the method for reserving and allocating resources for the ultra-low-latency uplink service flow based on the air interface slice.

Referring to FIG. 12, there are three retry windows in the figure. The first retry window mainly completes the negotiation process of reserved resources. In the figure, the base station side reserves two resources including RB1 of the first TTI and RB4 of the tenth TTI for ultra-low-latency service. In the second retry window, the ultra-low-latency service ULL is transmitted on RB1 of the first TTI. The base station side reallocates resources after detecting that ultra-low-latency data is transmitted on the reserved resources. The unused resources in the non-ultra-low-latency slice resources are allocated to the ultra-low-latency services for transmission until the ultra-low-latency data transmission is completed in the third retry window, and the base station side recovers the non-ultra-low-latency slice resources allocated to the ultra-low-latency services.

The reserved resource ultra-low-latency data transmission allocates the borrowed non-ultra-low-latency slice resources for ultra-low latency.

Figure 13:
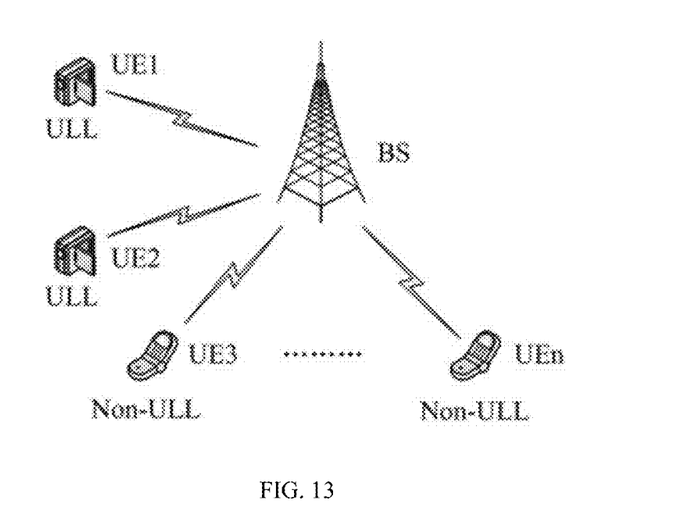
FIG. 13 is a diagram showing an initial scenario of the method for reserving and allocating resources for the ultra-low-latency uplink service flow based on the air interface slice.

Referring to FIG. 13, terminal 1 (UE1) and terminal 2 (UE2) transmit ultra-low-latency data (ULL), and terminal 3 (UE3) and terminal n (UEn) transmit non-ultra-low-latency data (Non-ULL). The specific resource reservation and ultra-low-latency data transmission process include: an ultra-low-latency reserved resource negotiation, an ultra-low-latency data transmission, and an ultra-low-latency service resource reallocation.

Ultra-Low-Latency Reserved Resource Negotiation

Figure 14:
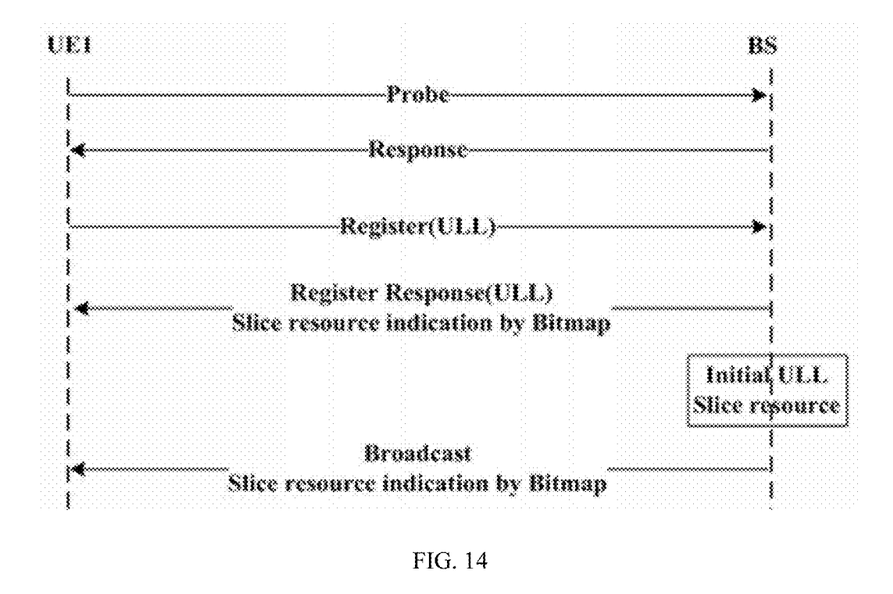
FIG. 14 is a diagram showing a negotiation process of ultra-low-latency reserved resources in the method for reserving and allocating resources for the ultra-low-latency uplink service flow based on the air interface slice.

Referring to FIG. 14, terminal 1 (UE1) first initiates an ultra-low-latency service registration request Register (ULL), and requests the base station to reserve a resource for an ultra-low-latency service. After parsing the resource reservation request, the base station determines whether to reserve the resource for the corresponding ultra-low-latency service. If the resource is approved to be reserved, then the location and TTI of the reserved RB resource is indicated by bitmap. The specific resource indication Slice Resource Indication by Bitmap is shown in FIG. 6. A two-dimensional grid composed of the RB resource location and TTI indicates the specific location and time slot of the reserved resource for ultra-low-latency service.

The ultra-low-latency reserved resource indication frame Slice Resource Indication by Bitmap is not necessarily returned when the terminal is registered. The base station side in the first subframe of each of the retry windows (Retry window) broadcasts the ultra-low-latency reserved resource indication frame Slice Resource Indication by Bitmap.

Ultra-Low-Latency Data Transmission

Figure 15:
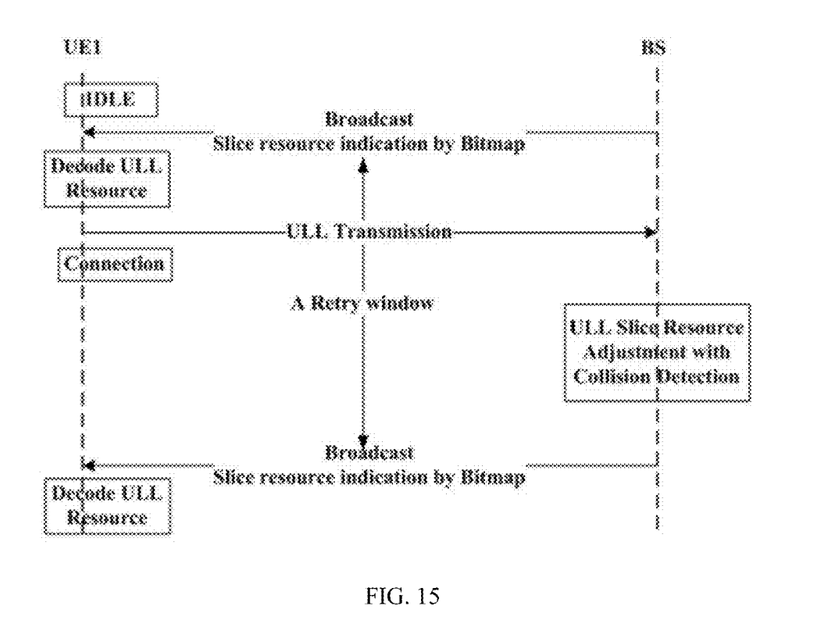
FIG. 15 is a diagram showing a process of using ultra-low-latency reserved sources and a process of dynamically adjusting the reserved resources in the method for reserving and allocating resources for the ultra-low-latency uplink service flow based on the air interface slice.

After receiving the ultra-low-latency reserved resource indication frame Slice Resource Indication by Bitmap from the base station side, the terminal parses out the position and time slot of the reserved resource in the bitmap. Before receiving the next ultra-low-latency reserved resource indication frame from the base station side, the parsed reserved resource can be used to transmit ultra-low-latency data (ULL Transmission) and the base station will count the data transmission conditions on the ultra-low-latency reserved resource within the time interval of one retry window. The size of the reserved resource is dynamically adjusted according to the collision situation on the reserved resource, that is, the ULL Slice Resource Adjustment with Collision Detection shown in FIG. 15. The dynamic adjustment of the reserved resource is realized by predicting the number of participating terminals in the next retry window according to the number of terminals with collisions in one retry window. In the first subframe of the next retry window, the ultra-low-latency reserved resource indication frame Slice Resource Indication by Bitmap is retransmitted to notify each terminal of the adjustment result of the reserved resource.

Ultra-Low-Latency Service Resource Reallocation.

Figure 16:
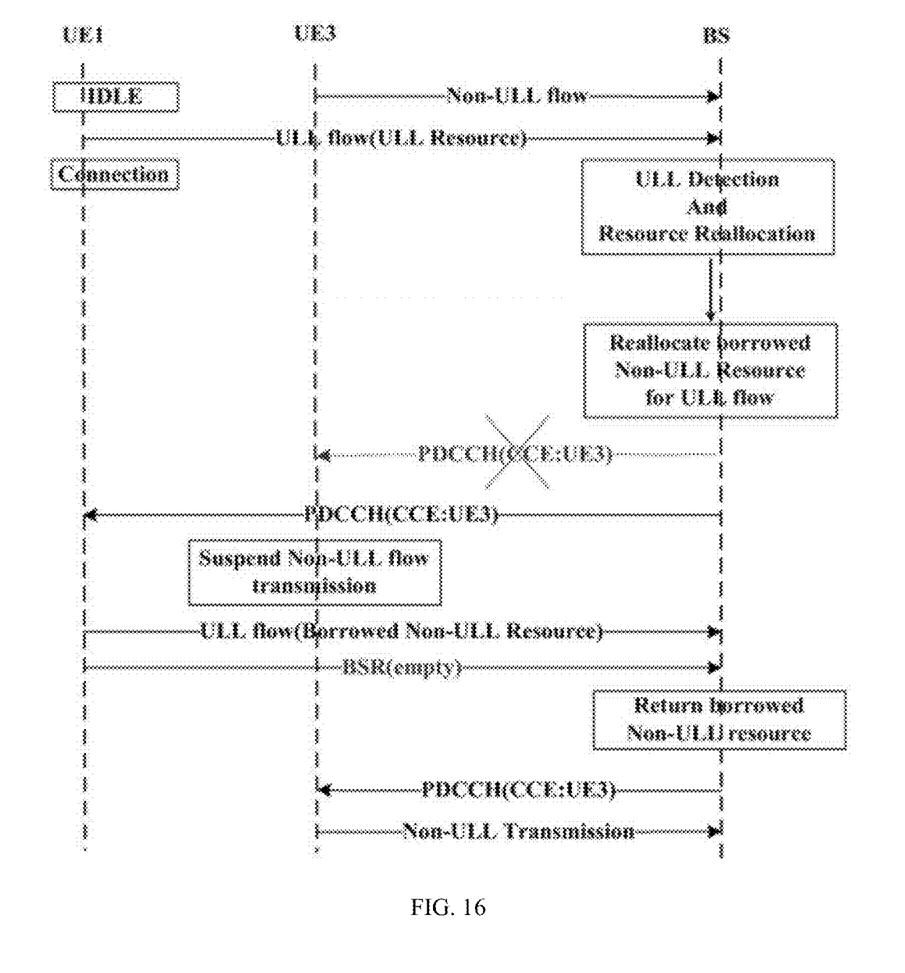
FIG. 16 is a diagram showing a use of ultra-low-latency reserved resources and a process of resource reallocation in the method for reserving and allocating resources for the ultra-low-latency uplink service flow based on the air interface slice.

After the terminal uses the reserved resource to transmit the ultra-low-latency data, when the base station detects that the terminal has transmitted the ultra-low-latency data on the corresponding reserved resource, resources for the ultra-low-latency service on this terminal are reallocated. As shown in FIG. 16, terminal 1 (UE1) uses the reserved resource to perform the ultra-low-latency data transmission ULL flow (ULL Resource), and the base station side detects that terminal 1 (UE1) transmits the ultra-low-latency data on the ultra-low-latency reserved resource (ULL Resource) through ULL Detection. At this time point, the base station reallocates the resource (Resource Reallocation) for the ultra-low-latency service on UE1, and at this time point, the base station first checks whether the non-ultra-low-latency slice resource has idle RB resources. It can be seen from FIG. 16 that the non-ultra-low-latency slice resource does not have the idle resource (Unused Non-ULL Resource) at this time point, so the base station borrows the non-ultra-low-latency slice resource (borrowed Non-ULL Resource) that has been allocated to the non-ultra-low-latency terminal and reallocates it to the ultra-low-latency terminal UE1. FIG. 16 shows the non-ultra-low-latency slice resource by which the non-ultra-low-latency terminal UE3 is borrowed, and a frame of the PDCCH (CCE: UE3) that is originally configured to be transmitted to UE3 is transmitted to UE1. Meanwhile, UE3 suspends the non-ultra-low-latency data transmission (Suspend Non-ULL Flow Transmission) and UE1 borrows the non-ultra-low-latency slice resource of UE3 to transmit the ultra-low-latency data ULL flow (Borrowed Non-ULL Resource). When the ultra-low-latency terminal reports that its BSR is empty, it indicates that the ultra-low-latency data transmission is completed. At this time point, the borrowed resource has to be returned (Return borrowed Non-ULL resource). The base station will return the resource borrowed by UE1 to terminal UE3 through the PDCCH (CCE: UE3), and then UE3 can use the returned resource to transmit the non-ultra-low-latency data.

Figure 17:
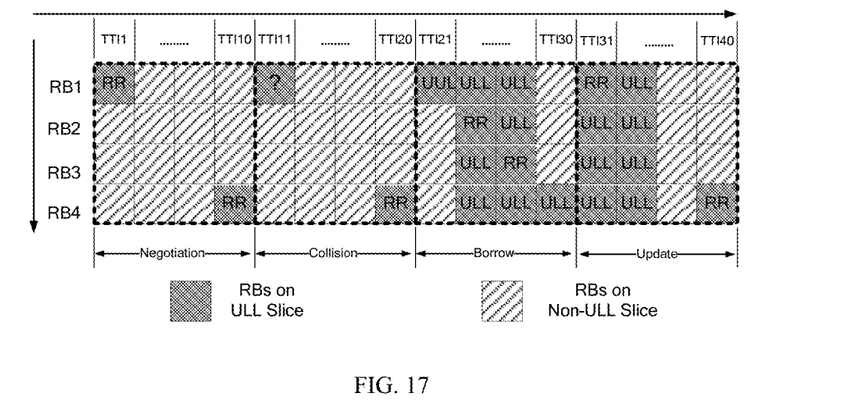
FIG. 17 is a flowchart showing an overall system from the resource negotiation to the resource reallocation (using non-ultra-low-latency slice resources to realize the resource reallocation for ultra-low-latency services) in the method for reserving and allocating resources for the ultra-low-latency uplink service flow based on the air interface slice.

Referring to FIG. 17, there are four retry windows in the figure. In the first retry window, the ultra-low-latency reserved resource negotiation is performed. In the second retry window, the ultra-low-latency data is transmitted by using the reserved resources. However, collisions occur on the reserved resources, numerous terminals concurrently use the reserved resources to transmit ultra-low-latency data, and the base station cannot parse out the terminals that transmit data on the reserved resources. Therefore, the base station adjusts the number of reserved resources in the third retry window. Here it is assumed that the reserved resources have doubled, and meanwhile, the ultra-low-latency data that has not been successfully transmitted in the previous retry window continues to be transmitted by using the dynamically adjusted reserved resources in the third retry window. When the base station detects that there is data transmission on the first RB resource, it is detected that there is no idle non-ultra-low-latency slice resource before performing resource reallocation, so the resource reallocation is performed by borrowing non-ultra-low-latency slice resources. However, there is no collision on the reserved resources in the third retry window, so the number of reserved resources is reduced to half of the previous number in the fourth retry window. Meanwhile, the borrowed non-ultra-low-latency slice resources are returned to the non-ultra-low-latency slice resources after the ultra-low-latency data transmission is completed.

Compared with traditional methods, the present invention uses a dynamic resource reservation method for resource allocation and time delay access, which avoids excessive interaction and delay of resource request signaling of conventional terminals, meets the latency requirements of ultra-low-latency data, and reduces the probability of collisions in the use of reserved resources by terminals. In addition, the base station detects whether there is ultra-low-latency data transmission, and if there is data transmission, then resources are immediately allocated. Meanwhile, when the individual resources are immediately allocated for the ultra-low-latency services, the resources of non-low-latency services can be preempted, that is, the non-ultra-low-latency resources are borrowed for the data transmission, which reduces the transmission delay of ultra-low-latency data.

Although the specific embodiments of the present invention have been described in detail with reference to the drawings, they should not be construed as limiting the protection scope of the present invention. Within the scope described in the claims, various modifications and variations that can be made by those skilled in the art without creative work still fall within the protection scope of the present invention.

What is claimed is:

1. A method for reserving and allocating resources for an ultra-low-latency uplink service flow based on an air interface slice, comprising:
   virtualizing an air interface resource of a base station into an ultra-low-latency slice resource and a non-ultra-low-latency slice resource;
   recording a collision situation on reserved resources in each of a plurality of retry windows, and dynamically adjusting a size of a reserved ultra-low-latency slice resource according to the collision situation;
   detecting that an ultra-low-latency terminal transmits ultra-low-latency data on the reserved ultra-low-latency slice resource, followed by performing a resource reallocation of an ultra-low-latency service and determining whether an idle non-ultra-low-latency slice resource is presented in the non-ultra-low-latency slice resource;
   in response to a first determination that the idle non-ultra-low-latency slice resource is presented, allocating the idle non-ultra-low-latency slice resource to the ultra-low-latency terminal transmitting the ultra-low-latency data and returning the idle non-ultra-low-latency slice resource borrowed after transmitting the ultra-low-latency data; and
   in response to a second determination that the idle non-ultra-low-latency slice resource is not presented, borrowing the non-ultra-low-latency slice resource allocated to a non-ultra-low-latency terminal and returning the non-ultra-low-latency slice resource borrowed after transmitting the ultra-low-latency data,
   wherein a method for transmitting the ultra-low-latency data comprises:
   receiving an indication of the reserved ultra-low-latency slice resource by a bitmap from the base station by the ultra-low-latency terminal, followed by parsing a location and a time slot of the reserved ultra-low-latency slice resource in the bitmap;
   counting, by the base station, a number of first terminals having collisions in a previous retry window, predicting a number of second terminals participating in a competition in a next retry window, thereby realizing a dynamic adjustment of the reserved ultra-low-latency slice resource; and
   retransmitting, in a first subframe of the next retry window, the indication of the reserved ultra-low-latency slice resource by the bitmap to notify each ultra-low-latency terminal of an adjustment result of the reserved resources.

2. The method for reserving and allocating the resources for the ultra-low-latency uplink service flow based on the air interface slice according to claim 1, wherein a method for negotiating the reserved ultra-low-latency slice resource comprises:
   initiating an ultra-low-latency service registration request by at least one of the ultra-low-latency terminal and an application server, and providing a resource reservation request including requesting the base station to reserve the resources for an ultra-low-latency service slice; and
   parsing, by the base station, the resource reservation request, and judging and approving the resource reservation request by the base station, and indicating the location and the time slot of the reserved ultra-low-latency slice resource through the bitmap.

3. The method for reserving and allocating the resources for the ultra-low-latency uplink service flow based on the air interface slice according to claim 1, wherein a method for scheduling and borrowing ultra-low-latency service resources comprises:
   upon the base station detecting the ultra-low-latency data is transmitted on the ultra-low-latency slice resource, determining if a current utilization rate of the non-ultra-low-latency slice resource is less than a preset threshold;
   if the current utilization rate of the non-ultra-low-latency slice resource is less than or equal to the preset threshold, allocating the idle non-ultra-low-latency slice resource to the ultra-low-latency terminal needing to transmit the ultra-low-latency data and allocating the idle non-ultra-low-latency slice resource to the ultra-low-latency service on the ultra-low-latency terminal through a physical downlink control channel (PDCCH) control signaling by the base station; and
   if the current utilization rate of the non-ultra-low-latency slice resource is greater than the preset threshold, borrowing the non-ultra-low-latency slice resource allocated to the non-ultra-low-latency terminal, wherein a signaling originally configured to notify the non-ultra-low-latency terminal through the PDCCH control signaling is transmitted to the ultra-low-latency terminal, the ultra-low-latency terminal borrows the non-ultra-low-latency slice resource to transmit the ultra-low-latency data, and simulataneously, the non-ultra-low-latency terminal borrows a shared buffer of an ultra-low-latency user and transmits the shared buffer to the ultra-low-latency terminal through a device-to-device (D2D) mode to buffer the ultra-low-latency data configured to be transmitted.

4. The method for reserving and allocating the resources for the ultra-low-latency uplink service flow based on the air interface slice according to claim 1, wherein a method for returning the ultra-low-latency slice resource comprises:
   when a buffer status report (BSR) reported by the ultra-low-latency terminal is empty, completing a transmission of the ultra-low-latency data, and returning the non-ultra-low-latency slice resource borrowed to the non-ultra-low-latency terminal by the base station.

5. The method for reserving and allocating the resources for the ultra-low-latency uplink service flow based on the air interface slice according to claim 1, wherein the non-ultra-low-latency terminal of the non-ultra-low-latency slice resource returns a shared buffer resource of the ultra-low-latency slice resource to an ultra-low-latency user through a D2D transmission mode.

6. The method for reserving and allocating the resources for the ultra-low-latency uplink service flow based on the air interface slice according to claim 1, wherein a transmission frame structure is divided into 100 transmission time intervals (TTIs), and the transmission frame structure is divided into the plurality of retry windows.

7. The method for reserving and allocating the resources for the ultra-low-latency uplink service flow based on the air interface slice according to claim 1, wherein the ultra-low-latency terminal to transmit an ultra-low-latency service actively requests the reserved resources for the ultra-low-latency service, or parses locations and time slots of the reserved resources for the ultra-low-latency service reserved by the base station from resource indication frames periodically broadcasted by the base station.

8. The method for reserving and allocating the resources for the ultra-low-latency uplink service flow based on the air interface slice according to claim 1, wherein the base station in the first subframe of each of the plurality of retry windows notifies each ultra-low-latency terminal of locations and time slots of the reserved resources corresponding to an ultra-low-latency service flow by broadcasting the bitmap.

9. The method for reserving and allocating the resources for the ultra-low-latency uplink service flow based on the air interface slice according to claim 1, wherein collisions on the reserved resources in the plurality of retry windows include a collision of separate random access channel (RACH) resources and a collision of physical downlink shared channel (PDSCH) resources.

* * * * *